Oct. 20, 1931.  H. E. KINGSLEY  1,827,987
GLIDER
Filed May 7, 1931  2 Sheets-Sheet 2
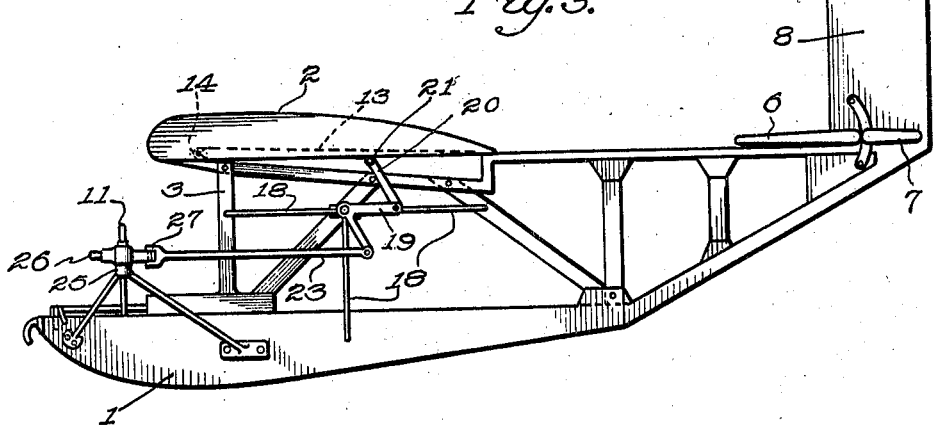
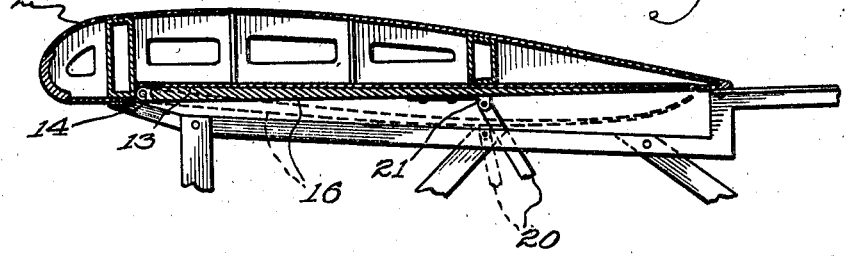
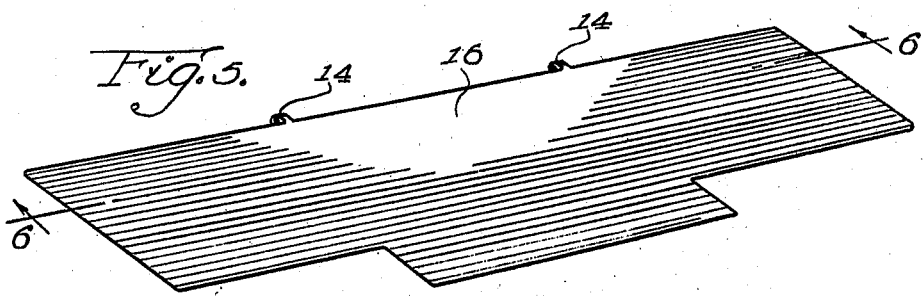
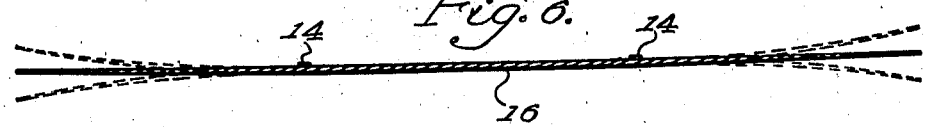
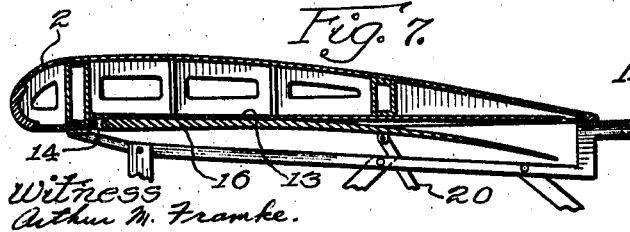
Inventor
Henry E. Kingsley.

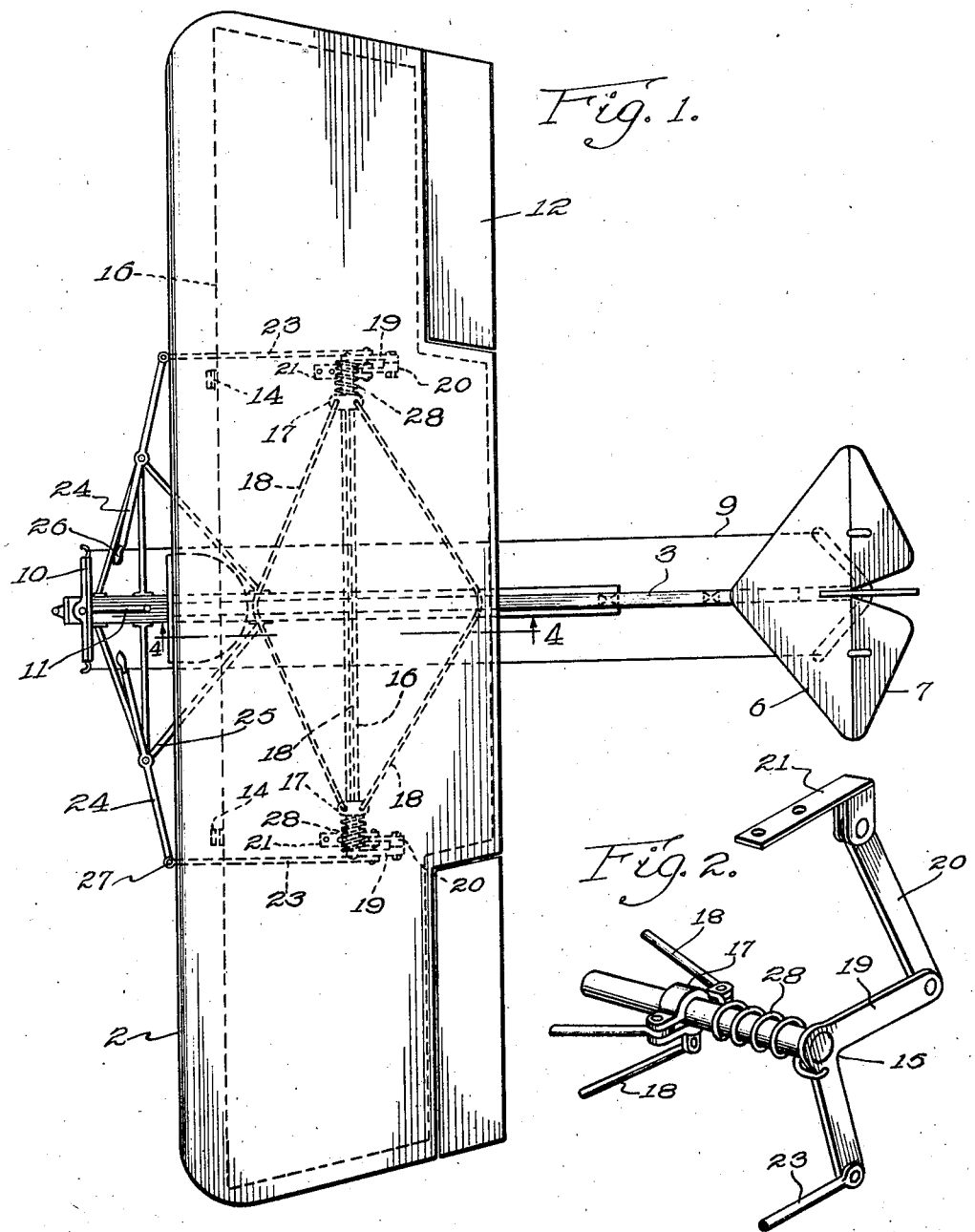

Patented Oct. 20, 1931

1,827,987

UNITED STATES PATENT OFFICE

HENRY E. KINGSLEY, OF CHICAGO, ILLINOIS

GLIDER

Application filed May 7, 1931. Serial No. 535,690.

This invention relates to aircraft, particularly to gliding, soaring or sailing planes and the purpose of the invention is to provide means thereon suitable for imparting lifting and propulsion impulses to the craft; and to provide improvements in the supporting wing structure which include, with a rigid wing, a cooperating, flexible wing element in hinged relation thereto and capable of having relative angular motion with reference to the fixed wing structure, in order to impart downward beats on the air and to force rearwardly a wedge-shaped column of air on the up-stroke of the flexible wing.

The objects of the invention are accomplished by means of a construction such as illustrated in the drawings, wherein:—

Figure 1 is a plan view of a glider provided with the improved lifting and propelling means.

Fig. 2 is a fragmentary perspective view of part of the wing actuating mechanism.

Fig. 3 is a side view of the glider.

Fig. 4 is a sectional view of the wing structure taken on the line 4—4 of Fig. 1.

Fig. 5 is a perspective view of the flexible propulsion wing.

Fig. 6 is a longitudinal, sectional view of the propulsion wing taken on the line 6—6 of Fig. 5.

Fig. 7 is a sectional view of the wing.

The improved construction is illustrated in connection with a glider of standard construction which is shown diagrammatically for the purpose of illustrating the relation of the improvement thereto, details of the rigging and control means of a glider being omitted from the drawings.

The improvement consists in hinging to the lower surface of the main supporting wing structure of a glider a flexible wing structure. The flexible wing structure is supported by hinged means along a transverse axis and at the forward edge of the flexible wing.

Means are provided for oscillating the flexible wing a few degrees upon such axis for the purpose of creating downward beats of the flexible wing for the purpose of imparting lifting impulses to the craft and at the same time a slight forward impulse due to the trailing end and sides of the wing flexing upwardly on the down-stroke. Upon the upward return stroke, the air which has entered between the two wing surfaces is forced rearwardly and to the sides, to impart a further forward impulse to the craft.

The flexible wing is preferably made to fit a correspondingly formed recess in the under surface of the main rigid wing structure, in order that when the flexible wing is in its uppermost position, the two wings will present a continuous flush lower surface extending at the same angle to a horizontal plane.

With reference to the drawings, a glider is illustrated comprising a fuselage 1, a rigid wing 2 connected with the fuselage by the frame structure 3 and braced by flying and landing wires. The usual stabilizer 6, elevator 7, and rudder 8 are shown without all of the customary control means therefor, except that the rudder is shown as connected by the cables 9 to a foot-actuated rudder bar 10 and a control stick is indicated at 11. The control stick, in addition to being connected to the elevator 7, is likewise, as usual, connected to the ailerons 12 hinged to the main supporting wing 2.

The main supporting wing is recessed at 13 on its under surface. The deepest part of this recess is along the forward end thereof from which it tapers to the trailing edge of the wing. The recess also tapers to a minimum thickness toward the tips of the wings. The flexible wing 16 exactly fits recess 13 and is hinged at 14, along its forward edge, to rigid wing 2. The fore and aft length of the recess and the flexible wing fitting therein is greater between the ailerons 12 than it is opposite the ailerons, as indicated by the broken lines 16 of Fig. 1.

The flexibility of the wing 16 increases with its taper and it is, therefore, of maximum rigidity along the forward hinged end. The trailing end being of sufficient flexibility to assume the form illustrated in Figure 4 on the down-stroke of the wing. Thus the resilient reaction of the air, which is struck by the wing on the downward stroke, is in an upward and forward direction. When in its lowermost position, the air pocket between the flexible wing and the rigid wing is of wedge-shape, indicated in Figure 2, with the base of the wedge at the trailing end of the wing. Upon the up-stroke of the flexible wing, the air between it and the rigid wing is accordingly forced outwardly in a rearward direction and sidewise and by reaction, adding a purely forward impulse to the craft.

The mechanism for oscillating the flexible wing includes the bell crank levers 15 which are secured to a transverse shaft 16 mounted in bearings 17, supported by tie rods 18 attached to the frame structure.

The horizontal arms 19 of these bell crank levers are connected by links 20 to brackets 21 secured to the flexible wing. The depending arms 22 of the bell cranks are pivotally connected to reciprocating pitmans or links 23. These may be operated by motor, not shown, or by means of the manually operated levers 24 pivotally supported on fixed brackets 25 and being provided with handles 26 at their inner ends, and pivotal connections 27 with links 23 at the outer ends.

The flexible wing is normally retained within the recess 13 by air pressure when in flight or by the action of springs 28 coiled around shaft 16 and bearing upon the bell cranks 15.

In the operation of the construction illustrated, the craft may be launched and sailed as is customary with gliders and soaring machines and without the use of the improved flexible wing structure, the flexible wing structure being operated when propulsion and lifting impulses are necessary to prolong the flight or to aid in clearing obstructions.

When the flexible wing is rapidly operated and caused to beat against the air below the main rigid wing on the down-stroke, it flexes upwardly, as illustrated by Figure 4, and on the up-stroke flexes downwardly, as illustrated by Figure 7. As this wing tapers from its more rigid, hinged front end rearwardly and also from the center sidewise to the tips of the wing, the flexing takes place mainly at the rear end of the wing and somewhat at the sides, as illustrated by Figure 6.

In my pending application for patent, Serial No. 416,528, filed December 26, 1929, Airplanes, there is disclosed an auxiliary wing structure mounted within a recess on the lower surface of the main supporting wing, but in that case, the auxiliary wing is rigid and is used for different purposes than the flexible structure associated with the rigid wing as herein claimed.

It is old in the art to mount beneath the main wing structure, and in a recess therein, ailerons for balancing purposes but such devices, so far as known to me, are employed for maintaining lateral balance and are not flexible in the manner necessary for attaining the purposes of the present invention.

Although but one specific embodiment of this invention has been herein shown and described, it will be understood that certain details of the construction shown may be altered or omitted without departing from the spirit of this invention as defined by the following claims:

I claim:

1. An air craft comprising a rigid wing structure provided with a recess on its lower surface, a flexible wing structure fitting said recess and hinged to the rigid wing along its forward edge, and means for oscillating said flexible wing out of and into said recess.

2. An air craft comprising a rigid wing structure, a flexible wing construction hinged to the under side of the rigid wing on a transverse axis along the forward edge of said flexible wing, said flexible wing tapering in thickness from its forward hinged edge toward the trailing edge and toward the sides of the wing, and means for oscillating said flexible wing away from and toward the rigid wing.

Signed at Chicago in the county of Cook and State of Illinois this 5th day of May 1931.

HENRY E. KINGSLEY.